United States Patent [19]

Hill et al.

[11] 4,210,871

[45] Jul. 1, 1980

[54] OPTIMUM DIVERSITY COMBINING CIRCUIT FOR A PLURALITY OF CHANNELS

[75] Inventors: Eugene R. Hill, Thousand Oaks; Eugene L. Law, Ventura, both of Calif.

[73] Assignee: The United States of America as represented by the Secretary of the Navy, Washington, D.C.

[21] Appl. No.: 939,163

[22] Filed: Sep. 1, 1978

[51] Int. Cl.² .......................... H04B 1/06; H04B 7/08
[52] U.S. Cl. .................................... 455/137; 455/273
[58] Field of Search ............... 325/305, 306, 367, 371, 325/56; 343/205

[56] References Cited

U.S. PATENT DOCUMENTS

| | | | |
|---|---|---|---|
| 3,341,778 | 9/1967 | Dryden | 325/305 |
| 3,934,204 | 1/1976 | Hill | 325/305 |

*Primary Examiner*—Marc E. Bookbinder
*Attorney, Agent, or Firm*—Richard S. Sciascia; Joseph M. St. Amand; Darrell E. Hollis

[57] ABSTRACT

An AM/AGC weighted diversity combiner utilizing the AGC and AM voltages from the AGC loops of a plurality of receivers for generating an optimum weighting signal or combining ratio.

22 Claims, 9 Drawing Figures

OPTIMUM DIVERSITY COMBINING CIRCUIT FOR A PLURALITY OF CHANNELS

BACKGROUND OF THE INVENTION

1. Field of the Invention

The present invention relates generally to weighted diversity combiners and more particularly to such combiners utilizing both AGC and AM voltages from the AGC loops of a plurality of receivers for generating an optimum weighting signal.

2. Description of the Prior Art

It is frequently desirable to combine signals from a plurality of receivers arriving at a plurality of points in a manner which provides maximum SNR to a load. However, it is usually difficult to process these signals so as to provide maximum SNR to the load. This is due in part to the fact that phase relationships of the mean frequencies of a given spectrum or the carriers of the incoming signals are generally independent of each other. The addition, therefore, of the two or more of such signals provides an output whose amplitude is dependent upon the vector sum of the incoming signals and results in an output varying as a function of the phase and amplitude relationships of the incoming signals. For example, when signals obtained from each of a plurality of antenna elements are added, the power transformed therefrom depends upon the relative location of each antenna element with respect to the transmitting source. Also, in an antenna array, the spacing of elements becomes important as does the spacing of transducers in an acoustical array.

In other instances, the transmission medium may change to bring about undesirable phase differences in the incoming signals to be combined. While under certain conditions phase discrepancies may be corrected to permit maximum signal power transfer to a load which in some instances may be a diversity receiver, in other cases, the transmitting medium and the direction of the source may vary in a manner such that phase correction becomes difficult if not impossible to achieve.

It is therefore desirable to combine a plurality of separate signals of differing phase to achieve maximum power transfer to a load irrespective to the phase relationships between the incoming signals. It is also desirable to combine modulated signals from a common source to achieve maximum power output when such signals are received by a plurality of antenna elements. In other instances, it is required that signals from a plurality of antenna elements be combined in an efficient manner when frequency diversity transmission is employed. Finally, it may be desirable to combine in an efficient manner individual signals which contain the same information when received irrespective of the transmission or receiving medium.

A straightforward and simple procedure for optimumly combining three or more signals is not known to exist in the prior art. One combining procedure described in U.S. Pat. No. 3,609,663 entitled "Predetection Signal Processing System" by Bickford et al. is capable of combining three or more signals. However, this technique involves a regenerative process that is quite complex and suffers from limitations such as a limited dynamic range of input signals. In addition, the invention of Bickford et al. is inherently narrow band with feedback and feedforward paths and is therefore unable to accommodate a wide-bandwidth fading signal.

SUMMARY OF THE INVENTION

The disdvantages of the prior art recited above are overcome by providing an optimal diversity combiner circuit for three or more incoming signals.

Accordingly, one object of the present invention is to provide a combiner that is not dependent on the tracking rate of an automatic gain control loop of the receivers.

Another object of the present invention is to provide a combiner that utilizes the AM and AGC voltages from the automatic gain control circuits of a plurality of receivers for weighting.

Another object of the present invention is to reduce cost and increase efficiency.

A still further object of the present invention is to provide an optimum diversity combiner circuit for a plurality of receivers.

Other objects and a more complete appreciation of the present invention and its many intended advantages will develop as the same becomes better understood by reference to the following detailed description when considered in connection with the accompanied drawings in which like reference numerals designate like parts throughout the figures of the drawings thereof and wherein.

DETAILED DESCRIPTION OF THE PREFERRED EMBODIMENT

The objective of the present invention is to combine three or more diversity signals in a manner to maximize the output signal-to-noise ratio (SNR).

The discussion which follows is premised on the following assumptions with respect to the input signal and noise voltages $(S_i(t)+N_i(t))$.

1. The signal and noise voltages in each channel are statistically independent.
2. The signals are coherent, i.e., phased aligned.
3. The noise components are uncorrelated and have mean values of zero.

Figure 4:
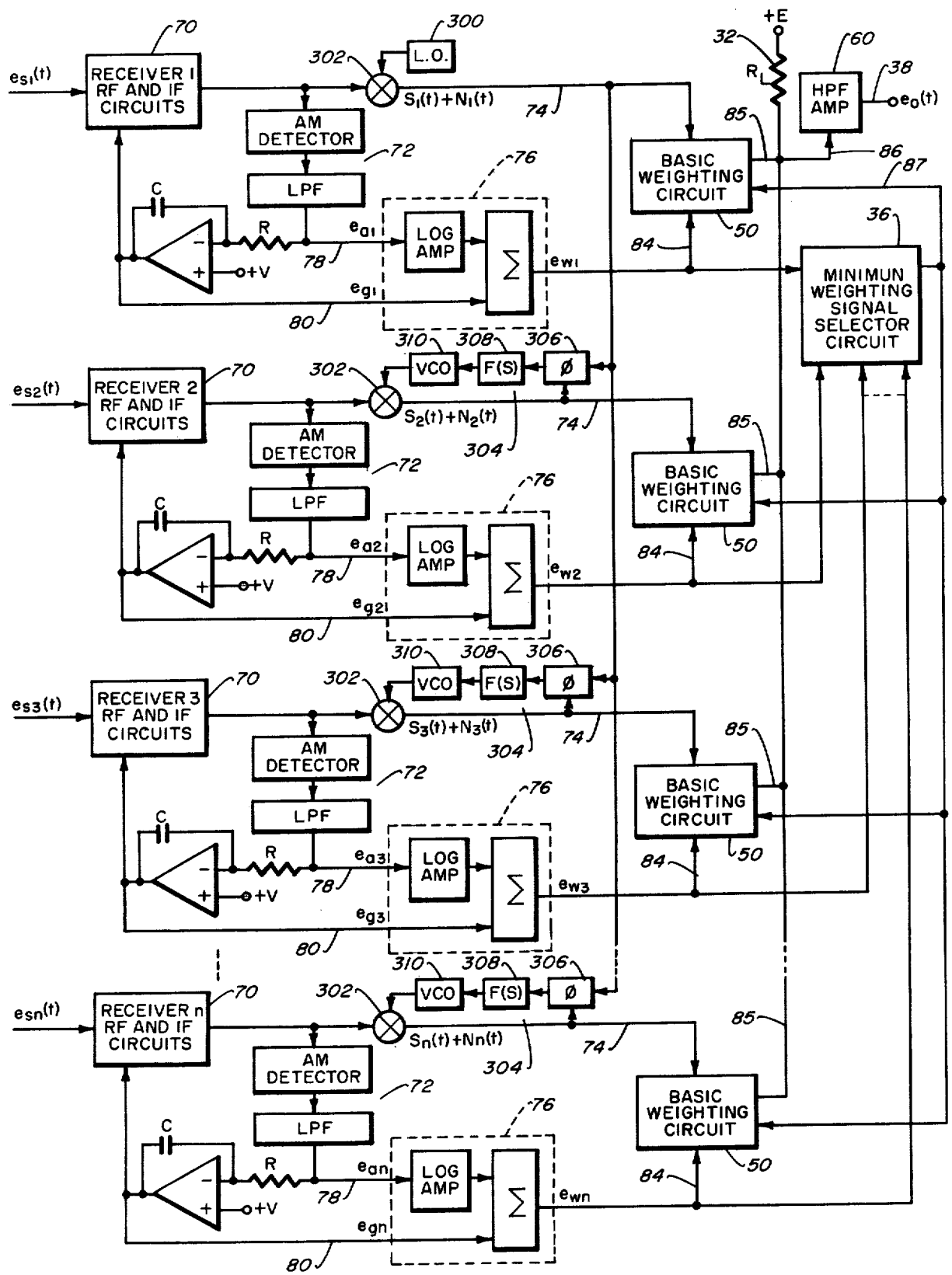
FIG. 4 illustrates the optimum diversity combining circuit for a plurality of channels.
Figure 9:
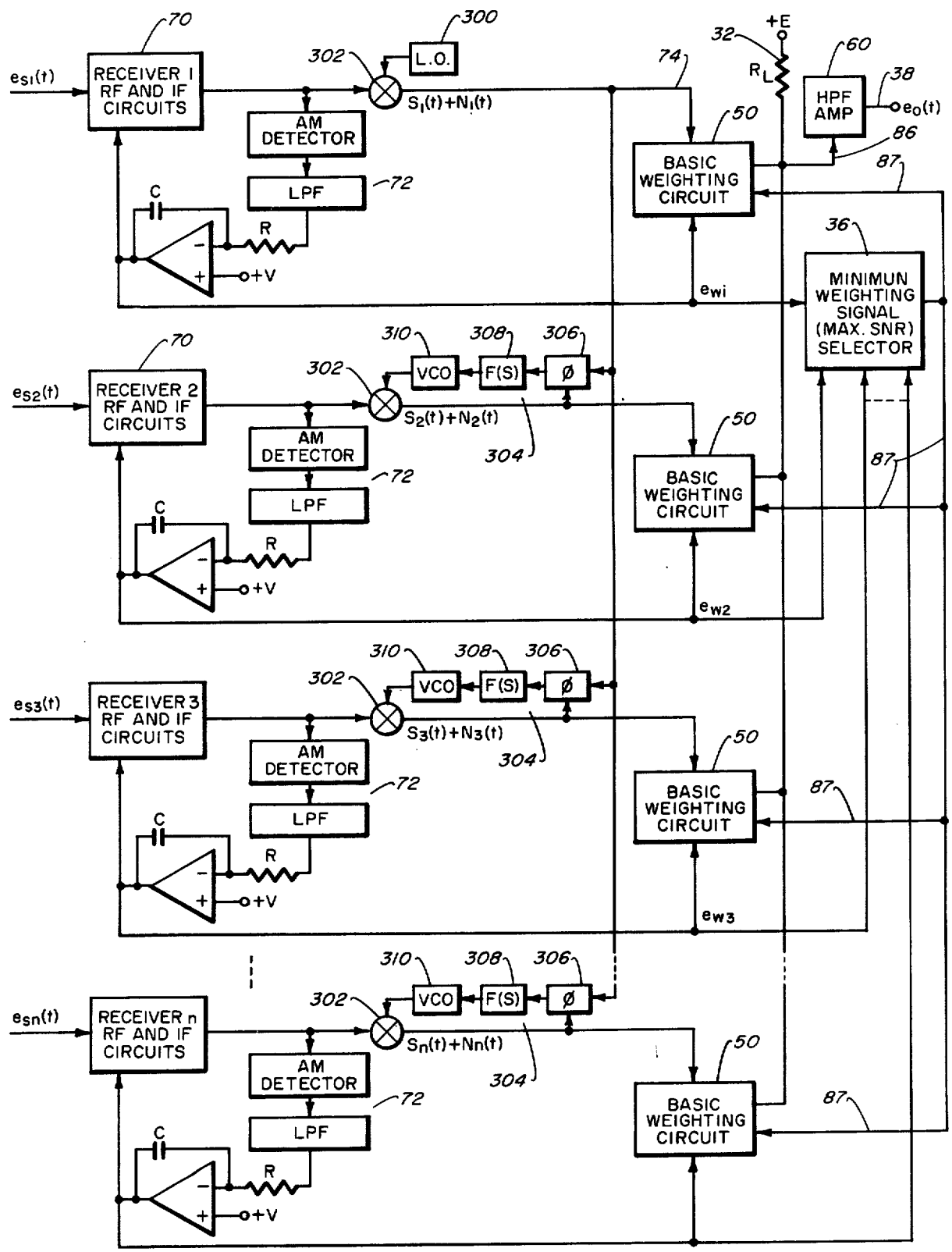
FIG. 9 illustrates an alternative embodiment of a optimum diversity combining circuit for a plurality of channels utilizing the AGC voltages only.

The phase alignment of the signal components is normally achieved by phase locked loop techniques such as those shown in FIGS. 4 and 9 of the drawings. The phase locked loop technique shown in FIGS. 4 and 9 comprises a reference local oscillator 300 whose output is mixed (multiplied) with the input signal and noise voltages from channel one. The mixed signal appearing on line 74 is coupled to phase locked loops 304 of channels 2, 3 ... n. Each phase locked loop comprises a phase detector 306, a loop filter 308, a voltage-controlled oscillator 310 and a mixer 302. Such phase locked loop techniques are common in the art, therefore, a detailed description of their operation is omitted.

The present invention teaches and illustrates a diversity combining circuit which can be expanded to accommodate any desired number of input signals.

The mathematical requirements of an optimum three channel diversity combiner will first be presented. It will then be shown that the subject invention is an accurate implementation of the theoretically optimum model.

Figure 1:
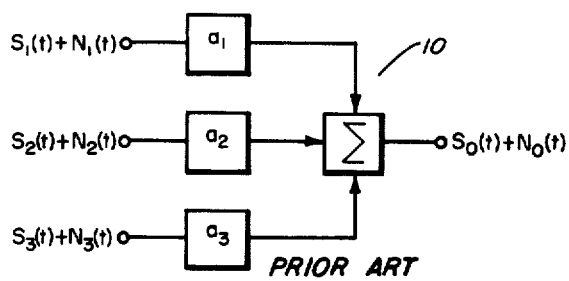
FIG. 1 is a block diagram of a prior art three channel linear diversity combiner.

Turning to FIG. 1, a block diagram of a prior art three channel diversity combiner 10 is shown. It can be shown (D. G. Brennan, "Linear Diversity Combining Techniques," Preceedings of the IRE, June 1959) that combiner 10 is an optimal combiner (i.e., it maximizes the output SNR) when the weighting coefficients are equal to:

$$a_1 = S_1/N_1^2 \quad (1)$$

$$a_2 = S_2/N_2^2 \quad (2)$$

$$a_3 = S_3/N_3^2 \quad (3)$$

where
$S_i$ = RMS signal voltages
$N_i^2$ = mean squared noise voltages
the output signal-to-noise ratio can be written:

$$\frac{S_o}{N_o} = \frac{a_1 S_1 + a_2 S_2 + a_3 S_3}{\sqrt{(a_1 N_1)^2 + (a_2 N_2)^2 + (a_3 N_3)^2}} \quad (4)$$

It is possible to designate one signal as a reference and weight the other two with respect to it. For example, if signal number three is selected as a reference channel, the new weighting coefficients can be found by dividing numerator and denominator of equation (4) by $a_3$ $$\frac{S_o}{N_o} = \frac{\left(\frac{a_1}{a_3}\right) S_1 + \left(\frac{a_2}{a_3}\right) S_2 + S_3}{\sqrt{\left(\frac{a_1}{a_3}\right)^2 N_1^2 + \left(\frac{a_2}{a_3}\right)^2 N_2^2 + N_3^2}} \quad (5)$$

Figure 2:
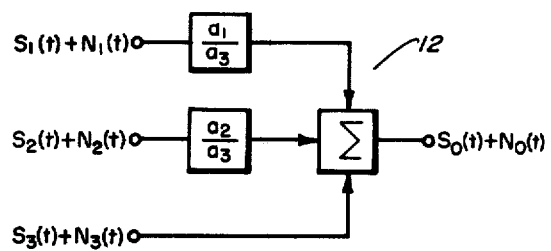
FIG. 2 is a block diagram of a three channel linear diversity combiner.

The new weighting coefficients for Channels 1 and 2 are now seen to be respectively $$a_1/a_3 = (S_1/S_3)(N_3^2/N_1^2) \quad (6)$$

$$a_2/a_3 = (S_2/S_3)(N_3^2/N_2^2) \quad (7)$$

and the new block diagram 12 appears in FIG. 2.

Figure 3:
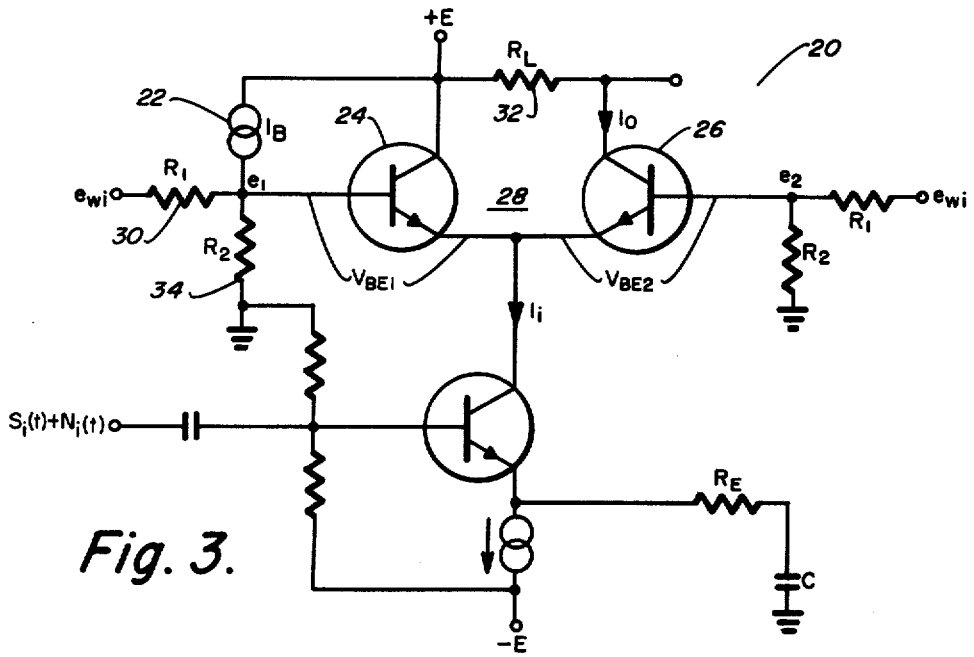
FIG. 3 is a schematic illustrating a basic weighting circuit for a diversity combining circuit.

It has been shown (E. R. Hill, "Time Domain Analysis of an AGC weighted Combiner," Proceedings International Telemetering Conference, Vol. 9, pp. 475-494, Oct. 1973) that the weighting coefficients in equations (6) and (7) are equal to the following exponential functions $$\frac{a_1}{a_3} = 10^{\frac{2}{KT}(e_{w3} - e_{w1})} \quad (8)$$

$$\frac{a_2}{a_3} = 10^{\frac{2}{KT}(e_{w3} - e_{w2})} \quad (9)$$

of the weighting signals which are defined by $$e_{w1} = e_{g1} - \log(e_{a1}/V) \quad (10)$$

$$e_{w2} = e_{g2} - \log(e_{a2}/V) \quad (11)$$

$$e_{w3} = e_{g3} - \log(e_{a3}/V) \quad (12)$$

where
$e_{gi}$ = receiver AGC voltages,
$e_{ai}$ = average absolute values of the linear i-f signals
V = bias voltage of the AGC integrators The above analysis assumes that the static AGC system of the receivers is defined by $$e_g = -K_1 \log K_2 e_S \quad (13)$$

where
$e_S$ = rms value of the rf input signal voltage
$K_1$ and $K_2$ are constants unique to the particular receiver The basic weighting circuit 20 utilized in combiner circuit 12 of FIG. 2 appears in FIG. 3 with output signal current $I_o$ and input signal current $I_i$. The input signal current $I_i$ is directly proportional to the input signal and noise voltages $S_i(t)$ and $N_i(t)$ with $$I_i = \frac{S_i(t) + N_i(t)}{R_E} \quad (14)$$

The output signal current $I_o$, in terms of the input signal current $I_i$, is equal to the following function of the differential base to emitter voltage $$I_o = \left[ \frac{10^{\left(\frac{\Delta V_{BE}}{K_3}\right)}}{10^{\left(\frac{\Delta V_{BE}}{K_3}\right)} + 1} \right] I_i \quad (15)$$

where $$\Delta V_{BE} = V_{BE2} - V_{BE1} \quad (16)$$

and $$K_3 = kT/q \log e = 59 mV @ T = 298° K. \quad (17)$$

where
k = Boltzmann's constant joules/° K.
T = absolute temperature (degrees Kelvin)
q = electron charge (coulombs)
E = 2.71828 ...
log = logarithm to the base 10

A bias current source 22 $I_B$ is introduced into the base of transistor 24 to cause the more complex function in equation 15 to approximate an exponential function as will be shown. Voltages $e_1$ and $e_2$ at the bases of transistors 24 and 26 which form differential amplifier circuit 28 in FIG. 3 can be expressed as functions of $e_{w1}$, $e_{w2}$ and $I_B$.

$$e_1 = \left(\frac{R_2}{R_1 + R_2}\right)e_{w1} + \left(\frac{R_1 R_2}{R_1 + R_2}\right)I_B \quad (18)$$

$$e_2 = \left(\frac{R_2}{R_1 + R_2}\right)e_{w2} \quad (19)$$

The differential base to emitter voltage $\Delta V_{BE}$ can be obtained by subtracting $e_1$ from $e_2$ $$\Delta V_{BE} = e_2 - e_1 = \quad (20)$$
$$\left(\frac{R_2}{R_1 + R_2}\right)(e_{w2} - e_{w1}) - \left(\frac{R_1 R_2}{R_1 + R_2}\right)I_B$$

Equation (15) can be rewritten by the use of equation (20)

$$I_o = \left[\frac{10^{\left(\frac{R_2}{K_3(R_1+R_2)}\right)\Delta e_w}}{10^{\left(\frac{R_2 \Delta e_w}{K_3(R_1+R_2)}\right)} + 10^{\left(\frac{E_B}{K_3}\right)}}\right] I_i \quad (21)$$

where $$\Delta e_w = e_{w2} - e_{w1} \quad (22)$$
$$E_B = \frac{R_1 R_2}{R_1 + R_2} I_B \quad (23)$$

If the bias current $I_B$ is set such that $$10^{\left(\frac{E_B}{K_3}\right)} >> 10^{\left(\frac{R_2 \Delta e_w}{K_3(R_1+R_2)}\right)} \quad (24)$$

then equation (21) can be approximated by $$I_o = \left[-\frac{E_B}{10^{K_3}}\right]\left[\frac{R_2 \Delta e_w}{10^{K_3(R_1+R_2)}}\right] I_i \quad (25)$$

which shows $I_i$ to be weighted by an exponential function of the differential weighting signal. By substituting equation (14) into equation (25) the input signal and noise voltages are seen to be weighted by this exponential function $$I_o(t) = \quad (26)$$
$$\left(\frac{1}{R_e}\right)\left(-\frac{E_B}{10^{K_3}}\right)\left(\frac{R_2}{10^{K_3(R_1+R_2)}}\Delta e_w\right)(S(t) + N(t))$$

Three diversity signals can be combined if three circuits such as those shown in FIG. 3 are coupled such that their output currents are linearly summed into a common load resistor such as resistor 32 of FIGS. 3 and 4. It is noted that the circuit illustrated in FIG. 4 comprises n channels. However, the reference to FIG. 4 with respect to the optimum three channel combiner refers to the first three channels thereof. One channel can be selected as a reference by applying its weighting signal to the resistor voltage divider comprised of resistors 109 and 111 and then to the base of transistor 26 in each independent basic weighting circuit 50 of FIG. 5. This can be shown by writing the output signal currents $I_o$ for the three channels by the use of equation (26)

$$I_{o1} = \quad (27)$$
$$\left(\frac{1}{R_E}\right)\left(-\frac{E_B}{10^{K_3}}\right)\left(\frac{R_2(e_{wr} - e_{w1})}{10^{K_3(R_1+R_2)}}\right)(S_1(t) + N_1(t))$$

$$I_{o2} = \quad (28)$$
$$\left(\frac{1}{R_E}\right)\left(-\frac{E_B}{10^{K_3}}\right)\left(\frac{R_2(e_{wr} - e_{w2})}{10^{K_3(R_1+R_2)}}\right)(S_2(t) + N_2(t))$$

$$I_{o3} = \quad (29)$$
$$\left(\frac{1}{R_E}\right)\left(-\frac{E_B}{10^{K_3}}\right)\left(\frac{R_2(e_{wr} - e_{w3})}{10^{K_3(R_1+R_2)}}\right)(S_3(t) + N_3(t))$$

where $e_{wr}$ = the weighting signal of the reference channel
$r = 1, 2, 3$

From equations (27), (28) and (29) the weighting coefficients are seen to be (except for a common constant of proportionality)

$$a_1 = \frac{R_2(e_{wr} - e_{w1})}{10^{K_3(R_1+R_2)}} \quad (30)$$

$$a_2 = \frac{R_2(e_{wr} - e_{w2})}{10^{K_3(R_1+R_2)}} \quad (31)$$

$$a_3 = \frac{R_2(e_{wr} - e_{w3})}{10^{K_3(R_1+R_2)}} \quad (32)$$

If channel three is selected as a reference channel, equations (30), (31) and (32) reduce to $$a_1 = \frac{R_2(e_{w3} - e_{w1})}{10^{K_3(R_1+R_2)}} \quad (33)$$

$$a_2 = \frac{R_2(e_{w3} - e_{w2})}{10^{K_3(R_1+R_2)}} \quad (34)$$

$$a_3 = 1 \quad (35)$$

Comparing equations (33) and (34) with equations (8) and (9) it is seen that the basic circuit 20 of FIG. 3 will produce the proper weighting provided that the parameter values are chosen such that $$2/K_1 = R_2/K_3(R_1+R_2) \quad (36)$$

or expressing resistor 30 ($R_1$) as a function of resistor 34 ($R_2$), $K_1$ and $K_3$ $$R_1 = (K_1 - 2K_3/2K_3)R_2 \quad (37)$$

It is clear that any channel could be utilized as a reference channel. However, from the standpoint of satisfying the inequality in equation (24) and thus preserving the exponential weighting, it is desirable to choose the channel with the greater signal-to-noise ratio or the channel with the minimum weighting signal as the reference channel. This is achieved by the final n channel combining circuit shown in FIG. 4 by the use of minimum weighting signal selector circuit 36 shown in FIG. 6. The channel with the more negative weighting signal and thus the greater signal-to-noise ratio will become the reference channel as only the diode with the most negative weighting signal applied thereto will conduct. The minimum weighting signal from selector 36 is coupled to each basic weighting circuit 50 via line 87.

The final output voltage $e_0(t)$ appearing on line 38 of FIG. 4 is equal to the linear sum of the currents in equations (27), (28) and (29) times the output load resistor 32 ($R_L$)

$$e_0(t) = (I_{01} + I_{02} + I_{03})R_L \tag{38}$$

and in terms of the weighting coefficients in equations (30), (31) and (32)

$$e_0(t) = \tag{39}$$

$$\frac{R_L}{R_E}\left(-\frac{E_B}{10^{K_3}}\right)[\alpha_1 S_1(t) + \alpha_2 S_2(t) + \alpha_3 S_3(t) +$$

$$\alpha_1 N_1(t) + \alpha_2 N_2(t) + \alpha_3 N_3(t)]$$

Figure 5:
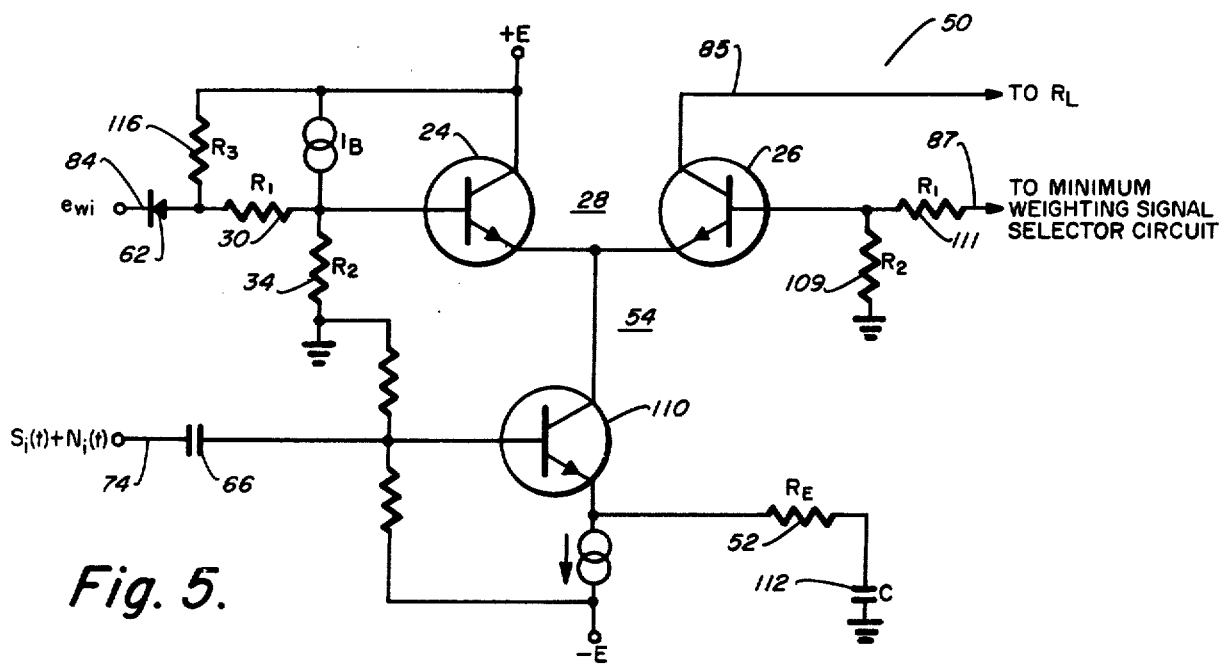
FIG. 5 is a schematic diagram illustrating the basic weighting circuit of the embodiment in FIG. 4.

Now turning to FIG. 5 basic weighting circuit 50 of FIG. 4 is illustrated in greater detail. The gain of the basic weighting circuit 50 illustrated in FIG. 5 is adjustable by the choice of the ratio of load resistor 32($R_L$) to resistor 52($R_E$) located in the emitter of circuit 54 which also permits compensation for the attenuation resulting from bias voltage $E_B$. A common emiter differential amplifier 28 is comprised of transistors 24 and 26 and input resistors 30 and 34. A common emitter circuit 54 is comprised of transistor 110 whose collector is connected to the common emitters of differential amplifier circuit 28. Resistor 52 and capacitor 112 are in series and connected between emitter of transistor 110 and ground potential.

Figure 6:
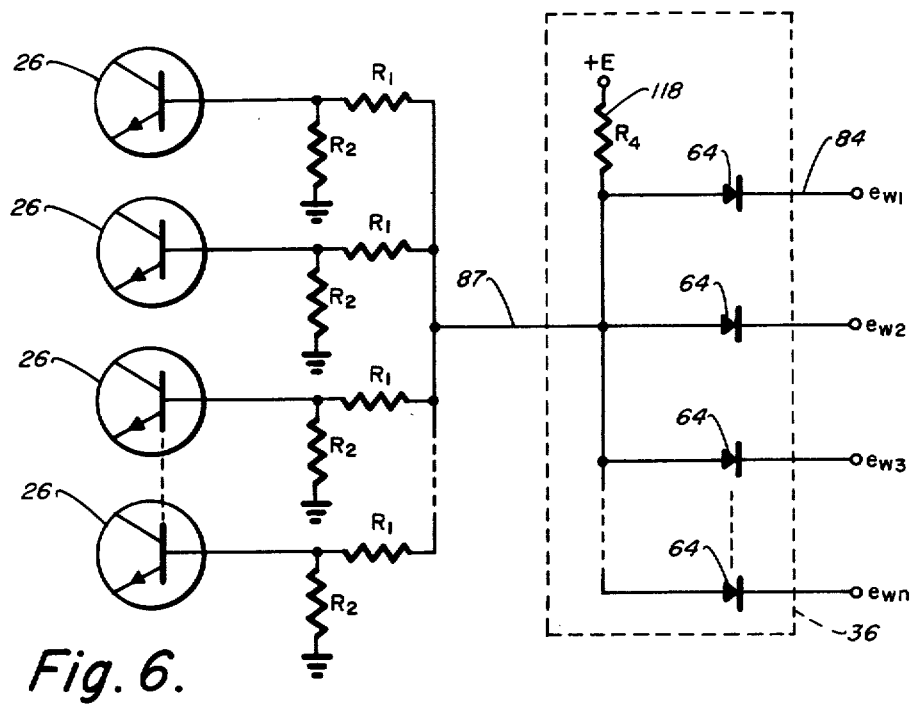
FIG. 6 is a schematic diagram illustrating the minimum weighting signals selector circuit of the embodiment of FIG. 4.

The diode 62 in series with the weighting signal on line 84 of FIG. 5 compensates for the voltage drop across the diodes 64 of minimum weighting signal selector circuit 36. Although diode matching is not critical, some care should be taken depending on the value of $K_1$ in equation (13). Fast recovery diodes such as Schottky Barrier should be used. Also, emitter follower transistors may be substituted for the diodes 62 and 64 if necessary to reduce the loading on the log and summing circuits 76. Resistors 116 and 118 of FIGS. 5 and 6 provide bias current to diodes 62 and 64, respectively, to minimize the variation of the diode voltage drop over the dynamic range of the weighting signals.

High pass filter 60 of FIG. 4 in series with the output is designed to prevent the weighting signals from appearing superimposed upon the output carrier.

Returning to FIG. 5, the weighting signal $e_{wi}$ is coupled to the differential amplifier circuit 28 from circuit 76 through diode 62. The signal and noise voltages for the $i^{th}$ channel are coupled to common emitter circuit 54 via AC coupling capacitor 66 and line 74.

Returning to FIG. 4, the n-channel AM/AGC diversity combining circuit is illustrated. Each channel contains a receiver, RF and IF circuits 70 and an AGC loop 72. The input signal and noise voltages are coupled to basic weighting circuit 50 from receiver 70 via line 74. The AM and AGC voltages are coupled to log and summing circuit 76 via lines 78 and 80, respectively. The weighting signal appearing on line 84 from log and summing circuit 76 is coupled to basic weighting circuit 50. The weighted signals appearing on line 85 are summed by output resistor 32 and coupled to high pass filter and amplifier circuit 60 via line 86. The combined output signal $e_0(t)$ appears on line 38.

Figure 7:
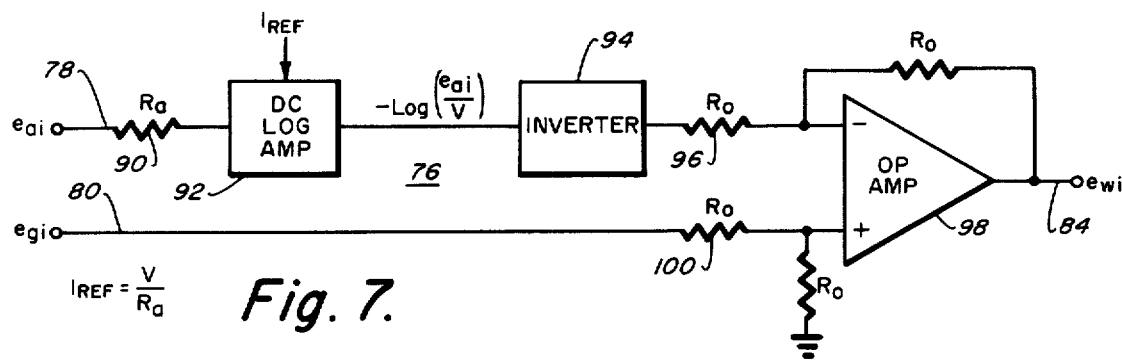
FIG. 7 is a schematic diagram illustrating one embodiment of the log and summing circuit of FIG. 4.
Figure 8:
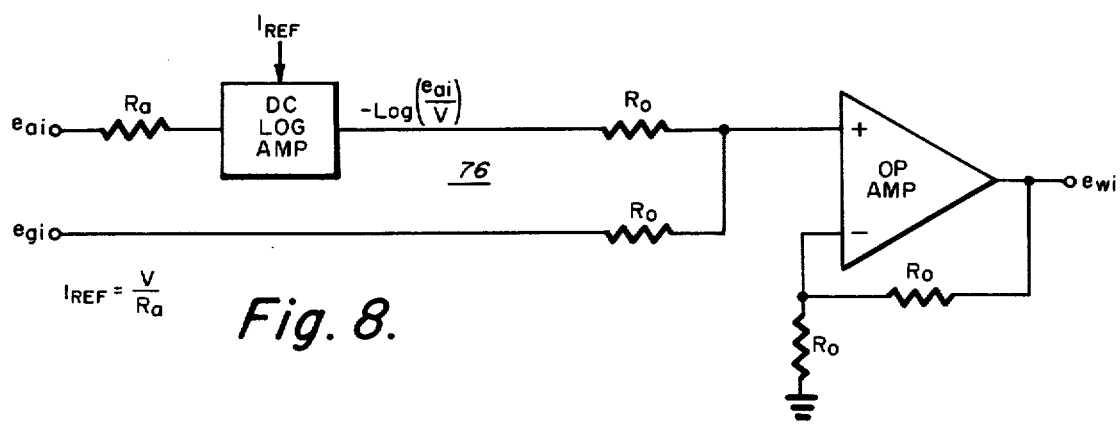
FIG. 8 is a schematic diagram illustrating a preferred embodiment of the log and summing circuit of FIG. 4.

Now turning to FIGS. 7 and 8, two embodiments of the log and summing circuit 76 of FIG. 4 is illustrated in schematic form. In FIG. 7 the AM voltage is coupled to resistor 90 via line 78. The AM voltage is then coupled to DC log amplifier 92, through invertor 94, and through resistor 96 to the negative input of operational amplifier 98. The AGC voltage appearing on line 80 is coupled to the positive input of operational amplifier 98 through resistor 100. $I_{REF}$ is also coupled to DC log amplifier 92

$$I_{REF} = V/R_a$$

The weighting signal appears on line 84. It is noted that $I_{REF}$ may be generated internal to logrithmic amplifier 92.

FIG. 8 illustrates an alternative embodiment of log and summing circuit 76. The circuit 76 of FIG. 8 provides a weighting signal identical to that of the circuit of FIG. 7 while eliminating the necessity of employing inverter 94.

Now turning to FIG. 6, the minimum signal selector circuit 36 of FIG. 4 is illustrated in greater detail. The circuit 36 is comprised of n diodes 64 with a weighting signal from each channel applied to each diode 64. The most negative weighting signal $e_{wi}$ is coupled to a resistor voltage divider network comprised of resistors 109 and 111 and then to the base of transistors 26 in each basic weighting circuit 50 as only the diode 64 with the most negative weighting signal applied thereto is conducting. The remaining diodes 64 are non-conducting or partially conducting.

Now turning to FIG. 9 an AGC diversity combining circuit is illustrated. The circuit of FIG. 9 is identical to the circuit of FIG. 4 except the AM voltage is not utilized to form part of the weighting signal. The circuit of FIG. 9 utilizes only the AGC voltage coupled directly to the basic weighting circuit 50 as the weighting signal. Operationally the circuit of FIG. 9 is identical to that of FIG. 4. The circuit of FIG. 4 utilizes the AM voltages in addition to the AGC voltages to increase the accuracy of the weighting signal. The AM voltages provide accurate weighting signals at frequencies higher than the AGC frequencies. For high frequency fading signals, the circuit of FIG. 4 is more accurate than the circuit of FIG. 9. However, for low fading frequencies the circuits of FIGS. 4 and 9 are equally accurate.

It will be appreciated by those skilled in the art that the complete circuit diagrams of FIGS. 1 through 6 include such suitable and necessary biasing voltage sources as are usually provided in such circuits. All such biasing is not shown in FIGS. 1 through 6.

The following is a list of definition of symbols appearing supra:

$S_i(t)$—instantaneous signal voltages of the $i^{th}$ diversity channel $N_i(t)$—instantaneous noise voltages of the $i^{th}$ diversity channel $S_o$—local rms signal voltage at the combiner output $N_o$—local rms noise voltage at the combiner output $S_i$—local rms signal voltage of the $i^{th}$ diversity channel $N_i$—local rms noise voltages of the $i^{th}$ diversity channel $e_{wi}$—weighting signals $e_{ai}$—local output of the $i^{th}$ fullwave coherent AM detector preceding the $i^{th}$ AGC integrator. (An average absolute value AM detector 72 is used to approximate an ideal fullwave coherent AM detector since a fullwave coherent AM detector is almost impossible to implement when frequency modulation is used.)

V—AGC integrator bias voltage $e_{gi}$—AGC voltages $e_{si}$—local rms voltages of the receiver RF input signals $K_1$—receiver constant $K_2$—receiver constant $K_3$—constant $a_i$—weighting coefficient of the $i^{th}$ channel Obviously numerous modifications and variations of the present invention are possible in light of the above teachings. It is therefore to be understood that within the scope of the appended claims the invention may be practiced otherwise than as specifically described herein.

What is claimed is:

1. An AM/AGC weighted diversity combiner circuit responsive to AGC and AM voltages from AGC loops (which include AGC integrators) of a plurality of receivers as well as respective instantaneous input signal and noise voltages of the receivers for combining a plurality of diversity signals whereby the output signal to noise ratio is maximized comprising:
   a. a plurality of log and summing circuits responsive to said AGC and AM voltages from said receivers for generating a plurality of independent weighting signals, each weighting signal being associated with a respective receiver;
   b. a plurality of weighting circuits; each respective weighting circuit responsive to respective said independent weighting signals and to respective said instantaneous input signal and noise voltages from respective said receivers for generating a plurality of respective independent weighted diversity signals, each weighted diversity signal being associated with a respective receiver; and
   c. means for summing said plurality of weighted diversity signals with said summed diversity signals being the output signal and noise voltages with maxmized signal-to-noise ratio.

2. The apparatus of claim 1 further including a high pass filter coupled to receive said output signal and noise voltages.

3. The apparatus of claim 1 wherein each said log and summing circuit includes means for generating a weighting signal $e_{wi}$ given by the following relationship $$e_{wi} = e_{gi} - \log(e_{ai}/V)$$

where $e_{ai} = i^{th}$ receiver AM voltage

V = bias voltage of the AGC loop integrators.

4. The apparatus of claim 3 wherein said weighting signal generating means includes
   a. a direct-current logarithmic amplifer coupled to receive said AM voltage for generating a log signal; and
   b. an operational amplifier having a feedback resistor responsive to said log signal and said AGC voltage for generating said weighting signal.

5. An AM/AGC weighted diversity combiner circuit responsive to the AGC and AM voltages from AGC loops of a plurality of receivers as well as respective instantaneous input signal and noise voltages of the receivers for combining a plurality of diversity signals whereby the output signal to noise ratio is maximized comprising:
   a. a plurality of log and summing circuits responsive to said AGC and AM voltages from said receivers for generating a plurality of weighting signals, each weighting signal being associated with a respective receiver;
   b. a plurality of weighting circuits responsive to said weighting signals and to said instantaneous input signal and noise voltages from said receivers for generating a plurality of weighted diversity signals, each weighted diversity signal being associated with a respective receiver;
   c. each said weighting circuit including:
      a differential amplifier circuit having common emitters, said differential amplifier circuit being coupled to receive said weighting signal; a common emitter circuit responsive to said input signal and noise voltages and coupled to said common emitters of said differential amplifier circuit; and means responsive to said weighting signal and coupled to said differential amplifier circuit for selecting one of said weighting circuits as a reference channel; and
   d. means for summing said plurality of weighted diversity signals with said summed diversity signals being the output signal and noise voltages with maximized signal-to-noise ratio.

6. The apparatus of claim 5 wherein said differential amplifier circuit comprises:
   a. a first transistor having a base, an emitter, and a collector;
   b. a second transistor having a base, an emitter, and a collector, said first and second transistor being substantially identical, said second transistor base being coupled to said selecting means, said second transistor emitter being coupled to said first transistor emitter, said first transistor collector being coupled to a second bias voltage, said weighted signal appearing on the collector of said second transistor; and
   c. a first resistor coupled between the base of said first transistor and said weighting signal;
   d. a second resistor coupled between the base of said first transistor and a reference voltage;
   e. a third resistor coupled between the collector of said first transistor and said first resistor; and
   f. a diode circuit for coupling said weighting signal to said first resistor.

7. The apparatus of claim 6 wherein said diode circuit includes a Schottky Barrier diode.

8. The apparatus of claim 6 wherein said common emitter circuit includes:
   a. a third transistor having an emitter, a collector, and a base, said third transistor collector being coupled to said first and second transistor emitters, said third transistor base being coupled to receive said input signal and noise voltages;
   b. a capacitor having a first and a second side, said first side being coupled to a reference voltage; and
   c. a fourth resistor being coupled between said third transistor emitter and said second side of said capacitor.

9. The apparatus of claim 8 wherein the values of said first ($R_1$) and second ($R_2$) resistors are given by the following relationships $$R_1/R_2 = (K_1 - 2K_3/2K_3)$$

where
$K_3 = kT/q \log e$
and
- k = Boltzman's constant
- T = Absolute Temperature
- q = electron charge
- e = 2.71828 ...
- log = logarithm to the base 10
- $K_1$ = a constant unique to a particular receiver.

10. The apparatus of claim 5 wherein said selecting means includes a diode circuit responsive to said weighting signal.

11. The apparatus of claim 10 wherein said diode circuit includes:
   a. a diode;
   b. a first resistor in series with said diode, said series diode and resistor coupling said weighting signal to said differential amplifier circuit; and
   c. a second resistor coupled between said differential amplifier circuit and a reference potential.

12. The apparatus of claim 11 wherein said diode includes a Schottky Barrier diode.

13. An AGC weighted diversity combiner circuit responsive to AGC voltages from AGC loops of a plurality of receivers as well as respective instantaneous input signal and noise voltages of the receivers for combining a plurality of diversity signals whereby the output signal to noise ratio is maximized comprising:
   a. a plurality of weighting circuits each responsive to a respective independent one of said AGC voltage from a respective one of said AGC loops and to respective said instantaneous input signal and noise voltages from respective said receivers for generating a plurality of respective independent weighted diversity signals, each respective weighted diversity signal being associated with a respective receiver; and
   b. means for summing said plurality of weighted diversity signals, said summed diversity signals being the output signal and noise voltages with maximized signal-to-noise ratio.

14. The apparatus of claim 13 further including a high pass filter coupled to receive said output signal and noise voltages.

15. An AGC weighted diversity combiner circuit responsive to AGC voltages from AGC loops of a plurality of receivers as well as respective instantaneous input signal and noise voltages of the receivers for combining a plurality of diversity signals whereby the output signal to noise ratio is maximized comprising:
   a. a plurality of weighting circuits responsive to said AGC voltages and to said respective instantaneous input signal and noise voltages from said receivers for generating a plurality of weighted diversity signals, each weighted diversity signal being associated with a respective receiver; and
   b. each said weighting circuit including:
      a differential amplifier circuit having common emitters, said differential amplifier circuit being coupled to receive said weighting signal;
      a common emitter circuit responsive to said input signal and noise voltages and coupled to said common emitters of said differential amplifier circuit; and means responsive to said weighting signal and coupled to said differential amplifier circuit for selecting one of said weighting circuits as a reference channel; and
   c. means for summing said plurality of weighted diversity signals, said summed diversity signals being the output signal and noise voltages with maximized signal-to-noise ratio.

16. The apparatus of claim 15 wherein said differential amplifier circuit comprises:
   a. a first transistor having a base, an emitter, and a collector;
   b. a second transistor having a base, an emitter, and a collector, said first and second transistor being substantially identical, said second transistor base being coupled to said selecting means, said second transistor emitter being coupled to said first transistor emitter, said first transistor collector being coupled to a second bias voltage, said weighted signal appearing on the collector of said second transistor; and
   c. a first resistor coupled between the base of said first transistor and said weighting signal;
   d. a second resistor coupled between the base of said first transistor and a reference voltage;
   e. a third resistor coupled between the collector of said first transistor and said first resistor; and
   f. a diode circuit for coupling said weighting signal to said first resistor.

17. The apparatus of claim 16 wherein said diode circuit includes a Schottky Barrier diode.

18. The apparatus of claim 16 wherein said common emitter circuit includes:
   a. a third transistor having an emitter, a collector, and a base, said third transistor collector being coupled to said first and second transistor emitters, said third transistor base being coupled to receive said input signal and noise voltages;
   b. a capacitor having a first and a second side, said first side being coupled to a reference voltage; and
   c. a fourth resistor being coupled between said third transistor emitter and said second side of said capacitor.

19. The apparatus of claim 18 wherein the values of said first ($R_1$) and second ($R_2$) resistors are given by the following relationships $$R_1/R_2 = (K_1 - 2K_3/2K_3)$$

where
$K_3 = kT/q \log e$
and
- k = Boltzman's constant
- T = Absolute Temperature
- q = electron charge
- e = 2.71828 ...
- log = logarithm to the base 10
- $K_1$ = a constant unique to a particular receiver.

20. The apparatus of claim 15 wherein said selecting means includes a diode circuit responsive to said weighting signal.

21. The apparatus of claim 20 wherein said diode circuit includes:
   a. a diode;
   b. a first resistor in series with said diode, said series diode and resistor coupling said weighting signal to said differential amplifier circuit; and
   c. a second resistor coupled between said differential amplifier circuit and a reference potential.

22. The apparatus of claim 21 wherein said diode includes a Schottky Barrier diode.

* * * * *